United States Patent [19]

Jensen

[11] Patent Number: 4,824,457
[45] Date of Patent: Apr. 25, 1989

[54] METHOD AND APPARATUS FOR CONTROLLING THERMAL ENVIRONMENT IN A GLASS FIBER FORMING PROCESS

[75] Inventor: Thomas H. Jensen, Murrysville, Pa.

[73] Assignee: PPG Industries, Inc., Pittsburgh, Pa.

[21] Appl. No.: 170,203

[22] Filed: Mar. 18, 1988

Related U.S. Application Data

[63] Continuation-in-part of Ser. No. 58,719, Jun. 5, 1987, abandoned, which is a continuation-in-part of Ser. No. 914,429, Oct. 2, 1986, abandoned, which is a continuation-in-part of Ser. No. 783,883, Oct. 3, 1985, abandoned, which is a continuation-in-part of Ser. No. 696,966, Jan. 31, 1985, abandoned.

[51] Int. Cl.$^4$ ............................................. C03B 37/012
[52] U.S. Cl. ......................................... 65/12; 65/356; 165/104.31
[58] Field of Search .......................... 65/2, 12, 356; 165/104.31

[56] References Cited

U.S. PATENT DOCUMENTS

| | | | |
|---|---|---|---|
| 2,634,553 | 4/1953 | Russell | 54/12 |
| 2,908,036 | 10/1959 | Russell | 65/12 |
| 2,947,028 | 8/1960 | Slayter | 65/12 |
| 3,251,665 | 5/1966 | Bour | 65/2 |
| 3,522,025 | 7/1970 | Smith | 65/12 |
| 3,647,382 | 3/1972 | Tilbrook | 65/12 |
| 3,695,858 | 10/1972 | Russell | 65/12 |
| 3,746,525 | 7/1973 | Kasuga et al. | 65/2 |
| 3,759,681 | 9/1973 | Russell | 65/12 |
| 3,868,494 | 2/1975 | Pepin | 219/341 |
| 4,059,145 | 11/1977 | Ruble | 165/1 |

Primary Examiner—Robert L. Lindsay
Attorney, Agent, or Firm—John E. Curley

[57] ABSTRACT

A method and apparatus for controlling a glass fiber forming environment is disclosed. A fin cooler having a plurality of hollow cooling fins, each provided with a coolant liquid flow passage and further having a header block provided with separate coolant liquid inflow and outflow channels, is placed in a closed loop coolant liquid circulation network. Water may be employed as the coolant, but preferably a heat transfer liquid having a boiling point higher than water, low vapor pressure, and a high specific heat value, is used as the coolant liquid. The heat transfer liquid takes on heat from the glass fibers as it passes through the cooling fins, and gives up this heat in a heat exchanger which may use plant process water or forced air as the secondary heat transfer medium. By regulating fluid flow, fin temperature can be manipulated to improve process control and product uniformity. The cooling fins operate at a temperature high enough to prevent glass volatiles form condensing on the fin surfaces and to prevent the formation of fin corroding acids. The closed loop cooling path prevents fin coolant passages occlusion or clogging.

28 Claims, 3 Drawing Sheets

METHOD AND APPARATUS FOR CONTROLLING THERMAL ENVIRONMENT IN A GLASS FIBER FORMING PROCESS

This application is a continuation-in-part of Ser. No. 58,719, filed June 5, 1987, which was a continuation-in-part of Ser. No. 914,429, filed Oct. 2, 1986, which was a continuation-in-part of Ser. No. 783,883, filed Oct. 3, 1985, which was a continuation-in-part of Ser. No. 696,966, filed Jan. 31, 1985, all now abandoned.

FIELD OF THE INVENTION

The present invention is directed generally to a method and apparatus for controlling a glass fiber forming process. More. particularly, the present invention is directed to a method and apparatus for controlling the thermal environment in forming a process by utilization of fin coolers having heat transfer liquid flow channels therein. Still more particularly, the present invention is directed to a method and apparatus for cooling glass fibers utilizing a heat exchange fluid which is passed in a closed loop system through heat transfer fins and heat exchange equipment.

In the preferred embodiment of the invention, the heat transfer fluid employed is one that has a boiling point above that of ater although water can be employed if its operating temperatures are controlled within certain limits. The preferred heat transfer fluid is also one having a specific heat of at least 0.5 calories per degree Centigrade per gm (cal/°C./gam) and a vapor pressure below 1 atmosphere at temperatures of 400° F. and below. Each heat transfer fin has an elongated flow passage formed within it so that the heat exchange fluid can flow through the full length of each fin in the fin cooler assembly. When high fin temperatures are established and maintained in accordance with the methods and apparatus of the present invention, i.e., temperatures above 150° F., fin cooler life is prolonged and heat transfer fin fouling from corrosion products is substantially reduced. Uniform and controlled fin temperatures at and above 150° F. which are obtained in accordance with the method and apparatus of the present invention further result in improved product uniformity, i.e., consistent fiber diameters, improved running efficiency, improved yardage uniformity and higher productivity.

DESCRIPTION OF THE PRIOR ART

Glass fibers are typically formed by flowing molten glass through a large number of closely spaced orifices located in a container which holds the molten glass. Such containers or bushings often have 2000, 4000, or even up to 6000 of such glass fiber forming tips or orifices. The molten glass which flows out through these arrays of bushing tips must be cooled in a controlled manner so that the glass fibers of filaments which are formed from the molten glass will be substantially uniform in diameter.

A plurality of generally planar, solid, elongated cooling fins are placed beneath the bushing tip plate and extend generally perpendicularly to the elongated rectangular bushing with the glass fibers of filaments passing between adjacent cooling fins and giving up heat to the fins. This heat transferred to the usually solid flat metal cooling fins is then transferred along the fins by conduction to a header block in which oone end of the fin is embedded and which header block typically is provided with flow passages through which a relatively cold cooling fluid such as the plant cooling water passes. Heat is removed from the header blocks by the transfer of heat to the cooling water passing through them and the cooling fins are then kept at a relatively low temperature at their junction with the header. The free ends of the fins on the other hand are substantially warmer than the ends in the header block thereby giving rise to large temperature variations across the fin surfaces.

With the advent of longer and wider bushing assemblies having 4000 to as many as 6000 glass forming orifices, heat removal has become more difficult necessitating the use of cooling fins that have been made longer so that they extend across the width of the bushing assembly. This incresed cooling fin length has given rise to even higher free end fin temperatures in presently used commercial solid fins. These high free end fin temperatures that are caused by inadequate heat transfer rates from the free end of the fin to the fin cooler header block have caused excessive free fin end oxidation and distortion that leads to a short fin cooler life. The cooler portion of the fin surfaces also accumulate solids which corrode surfaces and require cleaning. Frequent fin cooler cleaning or replacement is expensive and disruptive of bushing operation which its concomitant loss of productivity.

In addition, textile fiber glass strand products typically require higher levels of product uniformity than strand products used to provide rovings for resin reinforcement, for example. Textile glass fiber strands are used to manufacture cloth used for reinforcing high pressure laminates typically employed in circuit boards or for manufacturing decorative fabrics. These glass fiber strands have to be produced at a high level of product uniformity, consisting yardage per pound of glass fiber being one criteria. Consistent yardage isone indicator of uniform fiber diameters in a given strand. The use of the current commercial solid cooling fins has niot provided the desired properties to textile fibers in many instances on a reproducible basis. Further, since the cooling capabilities of the current solid fins are somewhat limited, forming tensions for textile fibers tend to be high and the glass throughput from the bushings making these fibers is low.

Attempts have been made to provide fin cooler assemblies in which the individual fins are hollow so that plant cooling water can be passed through the fins. Exemplary of prior art patents which disclose such cooled fin coolers are U.S. Pat. Nos. 3,251,665; 3,695,858; and 3,746,525. Past attempts at operating cooled fin coolers have met with only marginal success and these fin coolers have not been widely used by the glass fiber forming industry. Several general problems appear to be typical of prior art water cooled fin coolers. The flow of plant process or cooling water through the fins has produced fin temperatures which are unacceptably low, i.e., temperatures in the range of 70° F. to 100° F. on portions of the fins. These low temperatures on fin surfaces cause glass volatiles to condense out on the surfaces of the cooling fins causing unacceptably high corrosion rates and short fin life. Contaminant build up on the surfaces of the cooling fins also alters their heat transfer characteristics and creates nonuniformity in the glass fibers produced since the glass cooling is not uniform or consistent. The low temperature of the cooling fins caused by flow of coolant water through passages in the fins also allows the glass volatiles to mix with water in the environment normally present around a bushing to form corrosive acids that shorten fin life.

Further ordinary plant cooling water may not be completely free of entrained solid particles and contaminants. As this water flows through the relatively small passages in the fins of the prior art water cooled fin coolers, the flow passages may also become plugged or occluded. Such passage plugging in a fin renders the cooling fin inoperative and causes rapid failure of such a fin. In a large bushing assembly having a correspondingly large number of water cooled fins, the inoperativeness of random cooling fins caused by cooling water flow passage fouling will cause the heat transfer rates to vary from cooling fin to cooling fin. Strand sizes will thus vary, the product formed will have non-uniform filament diameters as a consequence and will therefore be unacceptable. Water coolant flow passage clogging in individual cooling fins is difficult to correct and requires the entire fine cooler be removed from the bushing assembly and repaired. These shutdowns are, of course, disruptive of production schedules and interfere with plant productivity.

As can thus be appreciated, there is a need in the glass fiber forming industry for a fin cooler which will be operable in a controlled, dependable manner so that fin surface temperature can be maintained high enough to reduce corrosion effects to acceptable levels and insure that temperatures be more uniform across the entire surface of the fin. Further, the cooled fin cooler must be able to operate free from distortions caused by inadequate cooling and must not be susceptible to failure due to flow passage clogging.

SUMMARY OF THE INVENTION

It is an object of the present invention to provide a method and apparatus for controlling a glass fiber forming process.

Another object of the present invention is to provide a method of controlling glass fiber forming environment using a fin cooler with substantially uniform temperature fins.

A further object of the present invention is to provide a fin cooler having heat transfer liquid flow passages therein and a heat transfer liquid system connected thereto and flowing through the passages to thereby maintain fin temperatures sufficiently high to minimize fin corrosion due to the condensation of volatiles adjacent to the fins.

Still another object of the present invention is to provide a method of controlling glass fiber forming utilizing a high specific heat fluid at controlled temperatures and rates of flow to provide a uniform environment around the fiber glass forming orifices or tips and uniform fin temperatures in the fin coolers used therein.

Yet a further object of the present invention is to provide a method and apparatus for controlling a glass fiber forming environment utilizing a closed loop heat exchange fluid flow path at preselected operating temperatures, flow rates and heat removal rates.

Still yet another object of the present invention is to provide a method of controlling a glass fiber forming process using a heat transfer fluid having a higher boiling point than water and a heat exchanger to remove heat from the system.

As will be presented in greater detail in the description of the preferred embodiment which is set subsequently, the present invention is directed to a method and apparatus for controlling glass fiber forming by attenuating molten glass fibers formed by a multiple orifice bushing assembly. A plurality of generally flat cooling fins, which are attached at first ends to header blocks to form fin coolers, are placed beneath the bushing tip plate. As the glass fibers pass between the spaced fins, the thermal environment area around the fins is controlled by transferring heat from the glass to the cooling fins while stabilizing the surface temperature of the fins. Each of these fins includes an interior, generally elongated U-shaped flow passage with an inlet port of this fin flow passage being in communication with a heat transfer fluid inflow channel in the fin cooler header block and with an outlet port from each fin heat transfer fluid flow passage being in communication with a separate outflow channel in the header block.

A heat transfer fluid having a high specific heat and which has a boiling point substantially higher than that of water and a vapor pressure at its operating temperature of less than 1 atmosphere is preferably used and is caused to flow in a closed loop through the fins and out. The outgoing fluid is then passed through a heat exchanger. Thus, heat is extracted from the glass fiber filaments by the fins adjacent thereto, transferred from the fin surface to a heat transfer fluid and the heat is then transferred to a secondary heat exchange fluid such as plant process water in a separate heat exchanger connected to the fin cooler.

"High specific heat" as used herein means a specific heat of at least 0.5 cal/°C./gm, preferably in the range of 0.6 cal/°C./gm to 0.7 cal/°C./gm. "Low vapor pressure" as used herein, means a vapor pressure at operating temperatures of less than 1 atmosphere.

Selection of the heat exchange fluid and its rate of circulation through the cooling fins and the rate at which heat is removed from it in the heat exchanger are parameters that are adjusted to insure that the surface portions of the cooling fins are maintained at a temperatures of 150° to 400° F., preferably in the range of 150° to 200° F. Surface temperatures in the preferred range are high enough to prevent the formation of glass volatile contaminants on the surface of the cooling fins by condensation from the adjacent environment. In contrast to prior water cooled fins, the use of heat transfer fluid in a closed loop system in accordance with the present invention will maintain the fin surfaces at a temperature higher than possible with water passing in the prior art non-closed loop system because of the ability to precisely control the temperature of the heat transfer fluid in the fins. Acid formation due to the mixing of glass volatile components with water condensate on the fin surfaces should thereby be minimized due to the elevated fin surface operating temperatures that are provided by the use of a high specific heat, high boiling temperature heat exchange fluid and the closed loop system of the invention while adequate heat removal from the glass filaments adjacent the fins is still accomplished.

The heat exchange fluid flows in a closed loop in accordance with the present invention. This flow path is continuous and extends between the flow path in the individual cooling fins, through the header block, to a heat exchanger unit that removes the heat from the heat transfer fluid, passes the heat transfer fluid through a filter and back through the cooling fins for further thermal treatment. This closed flow path prevents the clogging or plugging of flow passages in the cooling fins as was apt to be the situation with prior art open loop water cooledfins that generally utilized plant process water for cooling. Since the individual coolant flow paths in the various cooling fins are no longer apt to become plugged by inorganic oxide deposits, the frequency of fin cooler failure and failure related production interruptions are substantially reduced. When water is employed as the cooling fluid, utilization of distilled water is preferred.

The fin cooler in accordance with the preferred embodiment of the present invention and its method of usage with a high specific heat, high boiling temperature heat transfer fluid flowing in a closed loop provides a fin cooler which has a reduced tendency to accumulate glass volatile contaminants thereon or to be subjected to attack by corrosive acids because of its ability to maintain elevated surface temperatures, while still acting as a cooling surface for the glass fibers. Similarly, where water is employed, the same benefits accrue so long as temperatures of the circulating water are maintained above 150° F. Uniform fin temperature is provided by circulation of the heat transfer fluid through the fin so that fin distortion and oxidation is not a concern. The closed loop fluid circulation system of the invention allows the heat transfer fluid to remain clean and provides a means for contriolling fin surface temperatures by controlling the heat transfer fluid temperature through controlled heat removal at the heat exchanger to provide a given fin surface temperature. A controlled fin temperature is achieved by accurately controlling the secondary or plant water coolant flow through the heat exchanger. Thus the method and apparatus of glass fiber cooling in accordance with the present invention overcomes the disadvantages of the prior art while providing a system that is effective yet remains uncomplicated and reliable.

BRIEF DESCRIPTION OF THE DRAWINGS

With the novel features of the method and apparatus of cooling glass fibers in accordance with the present invention are set forth with particularity in the appended claims, a full and complete understanding of the invention may be had with reference to the detailed description of the preferred embodiment as set forth hereinafter and as may be seen in the accompanying drawings in which:

DESCRIPTION OF THE PREFERRED EMBODIMENT

Figure 1:
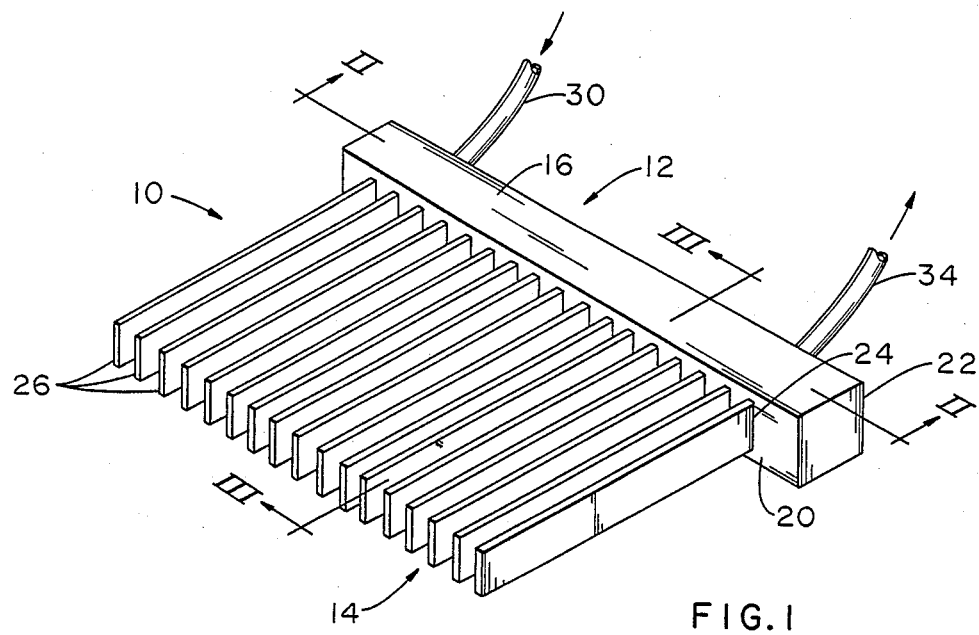
FIG. 1 is a perspective view of one embodiment of a fin cooler constructed generally in accordance with the present invention.

Referring initially to FIG. 1, there may be seen generally at 10 a cooled fin cooler in accordance with the present invention. Cooled fin cooler 10 includes a header block generally at 12 to which are attached a plurality of outwardly extending cooling fins 14. As is known generally in the art, fin coolers of this general type are typically placed beneath the tip plate of a glass fiber filament forming bushing assembly (not shown). Individual glass fibers, which are pulled from molten glass cones formed at the bushing tip plate, are attenuated by a suitable winder or the like. Groups of these individual fibers pass generally downwardly between the spaced cooling fings 14 which take heat away from the glass so that the glass will be properly cooled.

In the cooled fin cooler of the present invention, the header block 12 is generally in the shape of an elongated rectangular bar having a top surface 16, an opposed bottom surface 18, a front face 20 and an opposed rear face 22. Each of the plurality of cooling fins 14 is attached at a first end 24 to front face 20 of header block 12 in any generally conventional manner, such as by welding or brazing, and extends outwardly therefrom in a cantilever fashion to a second, free end 26.

Figure 2:
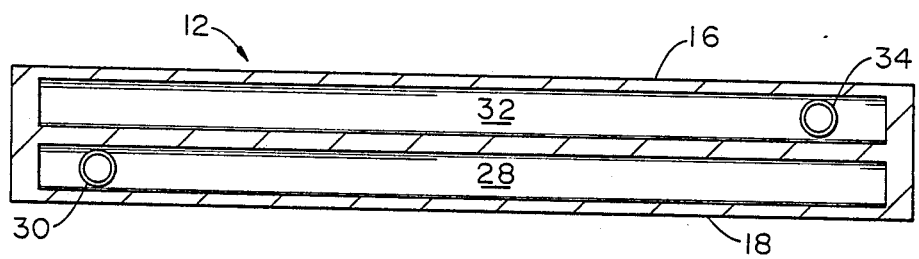
FIG. 2 is a cross-sectional view of the header block of the fin cooler of FIG. 1 taken along line II—II thereof.
Figure 3:
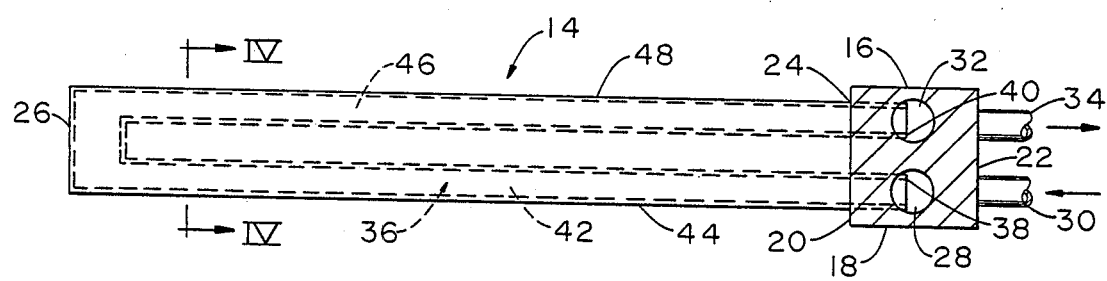
FIG. 3 is a side elevation view of the fin cooler of FIG. 1, partly in section and taken along line III—III thereof.

As may be seen in FIGS. 2 and 3, header block 12 includes a pair of spaced, separate, elongated coolant flow channels. A coolant liquid inflow channel 28 is formed in the interior of header block 12 generally closer to bottom surface 18 and extends the length of header block 12. A coolant liquid inflow line 30 is secured to header block 12 and supplies coolant liquid to inflow channel 28. A separate coolant liquid outflow channel 32 is formed in header block 12 and extends the length of header block 12 adjacent the top surface 16 thereof. Inflow channel 28 and outflow channel 32 are generally parallel to each other but are completely separate from each other. A coolant liquid outlet line 34 is in fluid communication with outflow channel 32 and provides a means for coolant liquid egress from header block 12.

Figure 4:
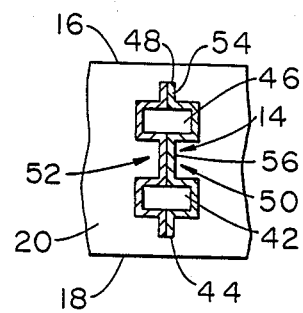
FIG. 4 is a cross-sectional view of one cooling fin taken along lin IV—IV of FIG. 3.

Referring again to FIG. 3, and as may also be seen in FIG. 4, each cooling fin 14 is provided with a generally elongated U-shaped coolant liquid flow passage 36. Flow passage 36 in each cooling fin 14 has an inlet port 38 which is placed in coolant liquid inflow channel 28 in header block 12. An outlet port 40 of each coolant liquid flow passage 36 is disposed in coolant liquid outlet channel 32 of header block 12. Each coolant liquid flow passage 36 in each cooling fin 14 extends from the first end 24 of fin 14 along a lower leg portion 42 adjacent bottom portion 44 of fin 14, to the free end 26 of fin 14 and then back through a top leg portion 46 of fin 14, adjacent upper edge 48 of fin 14 and back to the first end 24 of the fin 14. Coolant liquid flows into header block coolant liquid inflow channel 28 and into the lower leg 42 of coolant liquid flow passages 36 through inlet port 38. The coolant liquid flows out to the free end 26 of fin 14 and then back through top leg 48 of flow passages 36, back through outlet port 40 and into coolant liquid outflow channel 32 in header block 12. While coolant liquid inflow channel 28 and coolant liquid outflow channel 32 in header block 14 are not in direct fluid communication, they are in fact in contact with each other through the plurality of coolant liquid flow passages 36 in cooling fins 14.

A preferred structure of a cooling fin 14 is shown in FIG. 4 as being comprised of two similar, but opposed stamped metal panels 50 and 52, each of which is formed as one side of the cooling fin 14. Each stamped panel 50 and 52 includes a generally elongated U-shaped recess. When the two panels 50 and 52 are placed together and joined to each other by securement of peripheral and intermediate flange sections 14 and 56, respectively, by welding or the like there is formed cooling fin 14 having cooling liquid flow passage 36 therewithin. Each cooling fin 14 could be formed in one of several alternative ways to provide a generally rectangular hollow fin having a coolant liquid flow passage 36. For example, two planar metal panels could be secured together with peripheral and intermediate spacers to again define a generally U-shaped flow passage 36 in each cooling fin 14.

Figure 5:
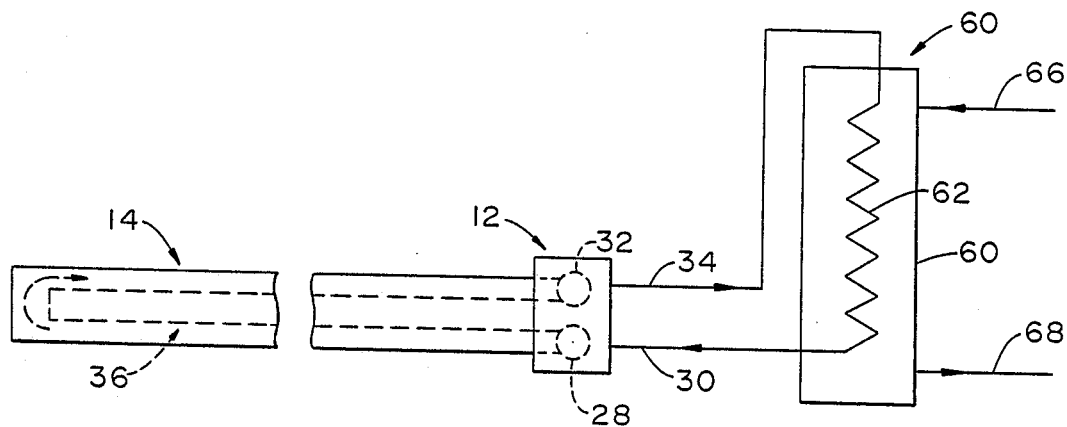
FIG. 5 is a schematic side elevation view of one embodiment of a fin cooler in accordance with the present invention showing the closed loop circulation path of the heat transfer fluid through the fin cooler and a heat exchanger.

Turning now to FIG. 5 there may be seen a schematic representation of a fin cooler and heat exchanger closed circuit for a cooled fin cooler in accordance with the present invention. A coolant liquid, which flows through flow passage 36 in cooling fin 14, enters header block 12 through coolant liquid inflow line 30 and exits through coolant liquid outflow line 34 as has previously been discussed. During its passage through cooling fin 14, the coolant liquid takes on heat through indirect heat transfer from the glass fiber filaments which pass between the cooling fins 14. This heat must be removed from the coolant liquid and this is accomplished by passing the hot liquid through a heat exchanger generally at 60. The hot liquid from the fin cooler 10 flows through a heat exchange core 62 around which continually circulates a secondary heat exchange fluid such as plant process water by means of a water inlet 66 and a water outlet 68 or by forced air cooling. The hot coolant liquid is cooled, and upon exiting from heat exchanger 60, is reused. The coolant liquid can thus be seen to be flowing in a closed loop in which it takes on heat in the cooling fis and gives off heat in the exchanger.

Figure 6:
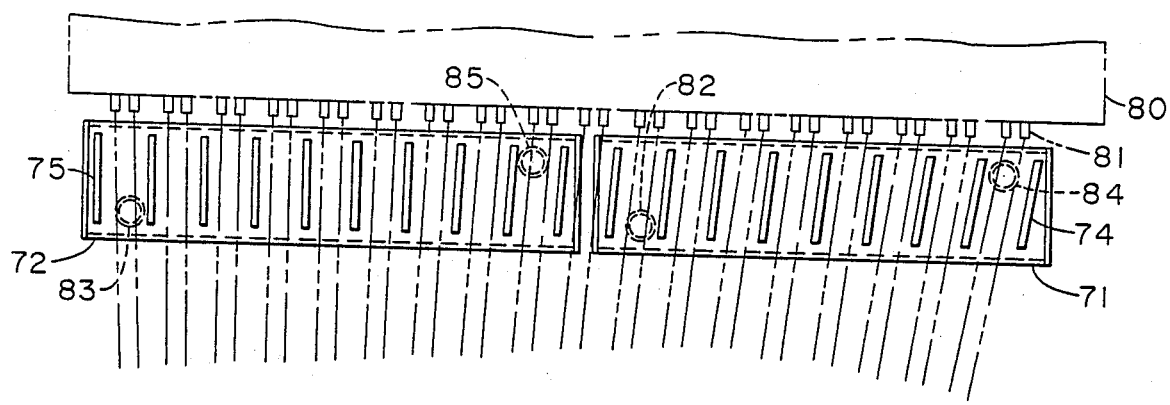
FIG. 6 is a front elevation of a preferred embodiment of the instant invention showing the cooling fins, the header and their relationship to the bushing tips.
Figure 7:
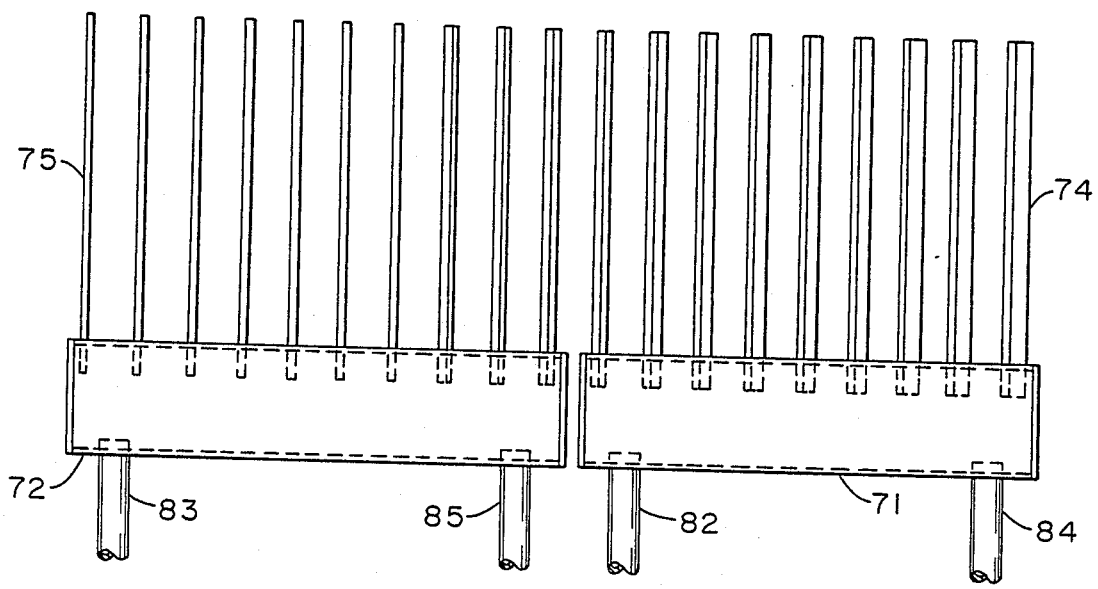
FIG. 7 is a plan view of two fin coolers of the preferred embodiment showing their positioning in the headers.
Figure 8:
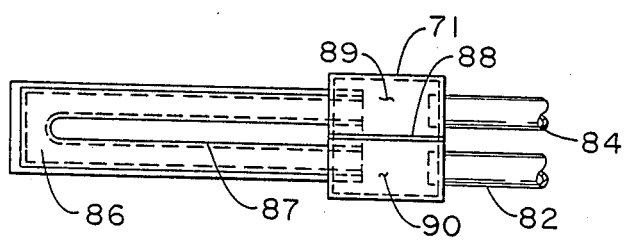
FIG. 8 is a side elevation in cross-section of header, fin and header fluid inlet and outlet.

Turning now to FIGS. 6, 7 and 8, there is shown the preferred embodiment of the fin cooler system of the instant invention. In FIG. 6, a fin cooler header 71 and 72 are shown positioned behind and below a bushing, 80 which has a multiplicity of fiber forming tips 81 on the bottom thereof. The tips 81 are arranged in rows and as shown, two rows of tips, 81 are positioned between the fins 74 of header 71 and fins 75 of heater 72. Fluid is introduced into headers 71 and 72 through inlets 82 and 83 respectively. Fluid exits the header 71 and 72 through outlets 84 and 85 respectively. Fins 74 and 75 are formed of two sheets of metal which are pinched toward each other along their center line and welded together to form the U-shaped channel 86 shown in FIG. 8. The solid metal center 87 divides the fin to provide that channel 86. In the header 71 shown in FIG. 8, a rectangular configuration is provided with dividing walls 88 therein to provide an upper chamber 89 and a lower chamber 90. As will be readily understood, the inlets 82 and 83 and outlets 84 and 85 are connected to a heat exchanger 60 such as shown in FIG. 5 so that fluid circulating in the fins 74 and 75 can be treated to extract heat and supply cooled fluid during operation.

As has been alluded to previously, in the preferred embodiment, the heat exchange liquid or coolant liquid which flows in the closed loop and which thus passes through the cooling fins 14 is selected from one of a number of heat exchange fluids that have a boiling point higher than water, a vapor pressure of below 1 atmosphere and a high specific heat value at operating temperature, i.e., at least 0.5/°C./gm. Exemplary of heat exchange fluids which would be suitable for such use as Hydrotherm 700-160 and Hydrotherm 750-200, manufactured by American Hydrotherm Corporation, or Dowtherm A or Dowtherm E which are made by Dow Chemical Company. Alternatively, various mineral oils or other heat exchange fluids may be used in the closed loop, cooled fin cooler in accordance with the present invention as long as they conform to the specific heat and vapor pressure requirements. Thus, high boiling alcohols such as glycerol, ethylene glycol, propylene glycol, 1,3-propanol may be used alone or diluted slightly with water, i.e., up to 15 to 20 percent so long as the boiling point of any such diluted alcohol is higher than water and the specific heat remains at a value of at least 0.5 cal/°C./gm witha vapor pressure below 1 atmosphere at an operation fin temperature of 150° F. or above, preferably 150° F. to 200° F. These heat exchange fluids have boiling points substantially higher than water and allow the cooling fins to operate at a temperature of 150°-400° F. or higher, preferably 150° F. to 200° F.

In instances where water alone is employed, it should be free of contaminants, maintained at or above 150° F. and below its boiling point as it circulates through the fins. This temperature is controlled by the heat removal in the heat exchanger and the rate of flow of water through the closed loop in which the water flows.

The upper limit of temperatures used with the material liquids other than water alone is determined by the failure point of the materials used in the fin and the boiling point of that liquid. Operation in temperature ranges of this magnitude reduces the deposition amounts of glass volatiles on the fin surfaces and also reduces the tendency to form corrosive acids on the cooling fin surfaces. Although the fins operate at a higher temperature than would be the case if they were operating in accordance with the teachings of the prior art with water used in an open system as a heat transfer fluid, the difference between the fin temperature of 150°-400° F. and the typical 2200° F. bushing tip exit temperature of the glass affords good heat transfer to the fins. It has been found further that by maintaining a margin of generally 25° to 100° F., preferably 50° to 100° F. or more between the operating temperature of the system in the fins and the boiling point of the heat transfer fluid used therein insures that the fluids employed will remain in liquid form at all times in all parts of the closed system. The specific operating temperature of the fin cooler can be controlled by proper selection of the desired heat transfer fluid and by control to the flow rate of the heat transfer fluid through the heat exchanger.

The method and apparatus for glass fiber cooling in accordance with the preferred embodiment of the present invention makes use of a heat transfer liquid having a boiling point hiher than water and a high specific heat to allow the cooling fins to operate at a temperature of generally about 150° to 400° F., preferably 150° to 200° F. Operating in this temperature range helps prevent glass contaminant deposition on the cooling fins, provides even fin temperature distribution, and prolongs fin life by impeding the formation of fin corroding acids. The closed loop path of the heat transfer fluid through the cooling fins and the heat exchanger allows the use of a contaminant free heat transfer medium which will remain contaminant free during use and will not occlude or plug the coolant liquid flow passages in the cooling fins. Thus the method and apparatus for cooling glass fibers in accordance with the present invention provides a substantial advance in the art. Further, benefits are provided in that, by adjustment of the fluid employed and the circulation rates through the fins and its consequent effect on fin temperature, the forming process itself can be adjusted to alter glass viscosities in the area of glass forming cones to adjust fiber diameters.

In a preferred mode operation of a fin cooler of the instant invention was used on an 800 tip fiber glass forming bushing in a laboratory furnace forehearth with a 90 percent ethylene glycol-10 percent water mixture used as the heat transfer media. The media was pumped through the fins of the fin cooler at a rate of about 500 milliliters per minute per fin. The fin surface temperatures were maintained at 160° F. by removing heat from the heat transfer fluid in the fluid heat exchanger which was operated with water as the heat exchange fluid at inlet temperatures of 80° F. and outlet temperatures of about 150° F.

In another preferred mode of operating the instant invention ten 800-tip fiber glass forming bushings were operated off a fiber glass furnace forehearth in a manufacturing plant utilizing the fin cooler system of the invention, each fin cooler having 38 fins per position. The ethylene glycol, the primary heat transfer media, circulating through tthe fins was a 70 percent ethylene glycol-30 percent water mixture. This ethylene glycol-water mixture was pumped through the fins of the fin coolers on all bushings at a rate of between 0.1 and 0.15 gallons per minute per individual fin. The fin surface temperature of the fins on the 10 bushing positions was maintained at 160° F. by removing heat from the primary heat transfer media, i.e., the 70/30 ethylene glycol water mixture in a heat exchanger in a closed loop system with water operating as the heat exchange fluid in the heat exchanger. Plant process water at approximately 80° F. was fed to the heat exchanger, and the outlet temperature of the water from the heat exchanger unit was about 150° F. Operating in this manner the fins were maintained at the approximate 160° F. surface temperature during the operation. The fins, except for a minor leak problem on three fins associated with the fin coolers, which were leaks at the braizing jointure of the fin with the fin cooler header, the operation of the fin system has been satisfactory and no system failures have occurred. During the course of this run which was conducted on a production furnace, two bushings and associated fins were utilized at the beginning, and as the trial progressed, further bushings and fins were added until the total number of 10 bushings and associated fins was achieved. One of the fin color positions employed during the course of the trial has achieved a service of 34 weeks without any failure. It has also been observed when the system was utilized on these positions that a lower broken filament levels were experienced during the operation of the bushings than was experienced with the normal solid fins previously employed for production from bushings of this design.

While preferred embodiments of a method and apparatus for cooling glass fibers in accordance with the present invention have been set forth fully and completely hereinabove, it will be obvious to one of skill in the art that a number of changes in, for example, the shape of the header block, the various fittings and connections, the structure of the heat exchanger and the like could be made without departing from the true spirit and scope of the subject invention which is accordingly to be limited only by the following claims. Similarly, in lieu of the peferred glycol-water used in the preferred mole various oils such as were described above can also be used. Thus, the invention is not to be limited except insofar as appears in the accompanying claims.

What is claimed:

1. In a method of cooling glass fibers formed from molten glass, wherein heat is extracted from the glass fibers as they are formed through a fin cooler assembly by indirect heat exchange through the fin surfaces, the improvement comprising: circulating in a closed loop through each fin a heat transfer fluid having a specific heat of at least 0.5 cal/°C./gm and a vapor pressure not over 1 atmosphere at operating temperature, at a rate sufficient to maintain the fin surfaces above about 150° F. and below a temperature which would cause fin distortion while extracting heat from the glass fiber forming environment into said heat transfer fluid and removing heat from the heat transfer fluid in a heat exchanger remote from the fins but located in the closed loop through which the heat transfer fluid flows as it circulates.

2. The method of claim 1, wherein the extracted heat in said heat transfer fluis is removed at a location remote from said fin cooler.

3. The method of claim 1, wherein the fin surfaces are maintained at temperatures between 150° F. and 200° F.

4. The method of claim 1, wherein the fin surfaces are maintained at a temperatures above 200° F.

5. A method of cooling glass fibers formed from molten glass in a glass forming bushing having a plurality of glass forming tips comprising the steps of:
   positioning a fin cooler having a plurality of spaced cooling fins adjacent the glass forming tips and passing the formed glass fibers between the spaced cooling fins;
   flowing a heat transfer fluid having a boiling point higher than water, a high specific heat and a low vapor pressure through flow passages in said spaced cooling fings;
   removing heat from said glass fibers as said fibers pass between said cooling fins and transferring the removed heat to said heat transfer fluid;
   cooling said heat transfer fluid in a heat exchanger to an extent sufficient to maintain the temperature of the cooling fins through which the cooled heat exchange fluid is flowing at a temperature of between 150°–400° F.; and
   circulating said heat transfer fluid in a closed lip continuously between said fin cooler and said heat exchanger.

6. The method of claim 5, wherein the temperature of the cooling fins is above about 200° F.

7. The method of claim 5, wherein the temperature of the cooling fins is between 150° F. and 200° F.

8. The method of claim 5 further including providing separate coolant liquid inflow and outflow channels in a header block of said fin cooler, and flowing said heat transfer fluid from said heat exchanger to said coolant liquid inflow channel and flowing said heat transfer fluid from said coolant liquid outflow channel to said heat exchanger.

9. The method of claim 8 further including providing a generally elongated U-shaped fluid flow path as said flow passage of each of said cooling fins, connecting an inlet portion of said flow passage to said coolant liquid inflow channel and connecting an outlet port of said flow passage of said coolant liquid outflow channel.

10. A fin cooler assembly in combination with a glass fiber forming bushing having a plurality of rows of glass forming tips, said fin cooler assembly comprising:

a fin cooler header including separate spaced coolant liquid inflow and coolant liquid outflow channels;

a plurality of parallel, spaced apart cooling fins secured at first ends to said header block and extending outwardly therefrom and constructed to fit beneath and between the said rows of bushing tips;

a coolant liquid flow passage in each of said cooling fins, each of said flow passages including an inlet port in fluid communication with said coolant liquid inflow channel and an outlet port in fluid communication with said coolant liquid inflow chanel;

a heat exchanger remote from said fin cooler header block and connected thereto in fluid communication therewith to form a closed loop fluid flow path between said fin cooler header and said heat exchanger and heat transfer fluid in said closed loop fluid flow path between said heat exchanger and said header block and through said coolant liquid flow passages in said cooling fins, means to circulate said heat transfer fluid in said closed loop and means in said heat exchanger to remove heat from said heat transfer fluid.

11. The fin cooler assembly of claim 10, wherein said coolant liquid flow passage in each of said cooling fins is generally an elongated U-shaped passage.

12. The method of claim 1, wherein a temperature differential of 50° to 100° F. is maintained between the fin surfaces and the boiling point of the heat transfer fluid.

13. The method of claim 3, wherein there is a temperature differential of 50° to 100° F. between the fin surfaces and the boiling point of the heat transfer fluid.

14. The method of claim 5, wherein there is a temperature differential of 50° to 100° F. between the fin surfaces and the boiling point of the heat transfer fluid.

15. The method of claim 6, wherein there is a temperature differential of 50° to 100° F. between the fin surfaces and the boiling point of the heat transfer fluid.

16. The method of claim 7, wherein there is a temperature differential of 50° to 100° F. between the fin surfaces and the boiling point of the heat transfer fluid.

17. In a method of cooling glass fibers formed from molten glass, wherein heat is extracted from the glass fibers as they are formed through a plurality of spaced apart fins of a fin cooler assembly by indirect heat exchange through the fin surfaces, the improvement comprising: circulating in a closed loop, through each fin, a heat transfer fluid at a temperature of at least 150° F. and below its boiling point, extracting heat from the environment around the fins and transferring it to the heat transfer fluid circulating in the fins, passing the heat transfer fluid to a heat exchanger located remote from the fins, extracting heat from the heat transfer fluid in the heat exchanger and balancing the heat removal in the heat exchanger and the flow rate of the heat transfer fluid to maintain the temperature of the heat transfer fluid in the fins at 150° F. or greater but below the boiling point of the heat transfer fluid to thereby maintain the fin surfaces at 150° F. or higher and below a temperature which would cause fin distortion while extracting heat from the environment around the fins.

18. In a method of cooling glass fibers formed from molten glass wherein heat is extracted from the glass fibers as they are formed through a plurality of spaced fins of a fin cooler assembly by indirect heat exchange through the fin surfaces, the improvement comprising-circulating water in a closed loop system through each fin at a temperature of at least 150° F. and below its boiling point, extracting heat from the environment adjacent the fins and transferring it to the water in the fins, passing the water from the fins to a heat exchanger in the closed loop and located remote from the fins, extracting heat from the water in the heat exchanger and balancing the rate of heat removal from the water in the heat exchanger and the rate of flow of water through the fins to control and maintain the water in the fins at a temperature of at least 150° F. or more but below its boiling point.

19. The method of claim 17, wherein the fin surfaces are maintained at temperatures between 150° F. and 200° F.

20. The method of claim 18, wherein the fin surfaces are maintained at temperatures between 150° F. and 200° F.

21. A method of cooling glass fibers formed from molten glass in a glass forming bushing having a plurality of glass forming tips comprising the steps of:

positioning a fin cooler having a plurality of spaced cooling fins adjacent the glass forming tips and passing the formed glass fibers between the spaced cooling fins;

flowing heat transfer fluid through flow passages in said spaced cooling fins;

removing heat from said glass fibers as said fibers pass between said cooling fins and transferring the removed heat to said heat transfer fluid;

cooling said heat transfer fluid in a heat exchanger continuously and to an extent sufficient to maintain the temperature of the cooling fins though which the cooled heat exchange fluid is flowing at a temperature of between 150°–400° F.; and circulating the said heat transfer fluid in a closed loop continuously between said fin cooler and said heat exchanger.

22. The method of claim 21, wherein the temperature of the cooling fins is between 150° F. and 200° F.

23. The method of claim 21 further including providing separate coolant liquid inflow and outflow channels in a header block of said fin cooler, and flowing said heat transfer fluid from said heat exchanger to said coolant liquid inflow channel and flowing said heat transfer fluid from said coolant liquid outflow channel to said heat exchanger.

24. The method of claim 23 further including providing a generally elongated U-shaped fluid flow path as said flow passage for each of said cooling fins, connecting the inlet of each said flow passage to said coolant liquid inflow channel and connecting the outlet of each said flow passage to said coolant liquid outflow channel.

25. A method of cooling glass fibers formed from molten glass in a glass forming bushing having a plurality of glass forming tips comprising the steps of:

positioning a fin cooler having a plurality of spaced cooling fins adajcent the glass forming tips and passing the formed glass fibers between the spaced cooling fins;

flowing water continuously through flow passages in said spaced cooling fins;

removing heat from said glass fibers as said fibers pass between said cooling fins and transferring the removed heat to said water;

cooling said water in a heat exchanger continuously and to an extent sufficient to maintain the temperature of the cooling fins through which the cooled water is flowing at a temperature of at least 150° F. and the water below its boiling point; and circulating said water in closed loop continuously between said fin cooler and said heat exchanger.

26. The method of claim 25, wherein the temperature of the cooling fins is maintained between 150° F. and 200° F.

27. The method of claim 25 further including providing separate coolant water inflow and outflow channels in a header block of said fin cooler, and flowing said water from said heat exchanger to said coolant water inflow channel and flowing said water from said coolant liquid outflow channel to said heat exchanger.

28. The method of claim 27 further including providing a generally elongated U-shaped fluid flow path as said flow passage of each of said cooling fins, connecting the inlet of said flow passage to said coolant water inflow channel and connecting the outlet of said flow passage to said coolant water outflow channel.

* * * * *

UNITED STATES PATENT AND TRADEMARK OFFICE
CERTIFICATE OF CORRECTION

PATENT NO.   : 4,824,457

DATED        : April 25, 1989

INVENTOR(S)  : Thomas H. Jensen

It is certified that error appears in the above-identified patent and that said Letters Patent is hereby corrected as shown below:

Column 1, line 16, after the term "More" delete the period.

Column 1, line 27, after the term "of" delete the term 'ater' and insert the term --water--.

Column 1, line 31, "(cal/°C./gam)" should read '(cal/°C./gm)".

Column 1, line 56, after the term "fibers" delete the term 'of' and insert the term --or--.

Column 1, line 62, after the term "fibers" delete the term 'of' and insert the term --or--.

Column 1, line 66, after the term "which" delete the term 'oone' and insert the term --one--.

Column 2, line 15, after the term "This" delete the term 'incresed' and insert the term --increased--.

Column 2, line 35, after the term "uniformity," delete the term 'consisting' and insert the term --consistent--.

Column 2, line 36, after the term "yardage" delete the term 'isone' and insert the terms --is one--.

Column 2, line 39, before the term "provided" delete the term 'niot' and insert the term --not--.

Column 3, line 3, after the term "Further" insert a comma (,).

UNITED STATES PATENT AND TRADEMARK OFFICE
CERTIFICATE OF CORRECTION

PATENT NO. : 4,824,457

DATED : April 25, 1989

INVENTOR(S) : Thomas H. Jensen

It is certified that error appears in the above-identified patent and that said Letters Patent is hereby corrected as shown below:

Column 3, line 44, after the term "transfer" delete the term 'liquid' and insert the term --fluid--.

Column 3, line 66, after the term "set" insert the term --forth--.

Column 4, line 68, after the term "water" delete the term 'cooledfins' and insert the terms --cooled fins--.

Column 5, line 24, after the term "for" delete the term 'contriolling' and insert the term --controlling--.

Column 6, line 16, after the term "cooling" delete the term 'fings' and insert the term --fins--.

Column 6, lines 50-51, after the term "liquid" delete the term 'outlet' and insert the term --outflow--.

Column 6, line 65, after the term "block" delete the number '14' and insert the number --12--.

Column 6, line 59, after the term "flow" delete the term 'passages' and insert the term --passage--.

Column 7, line 8, after the term "sections" delete the number '14' and insert the number --54--.

Column 7, line 39, after the word "cooling" delete the term 'fis' and insert the term --fins--.

Column 7, line 41, after the word "Turning" delete the term 'now'.

UNITED STATES PATENT AND TRADEMARK OFFICE
CERTIFICATE OF CORRECTION

PATENT NO. : 4,824,457

DATED : April 25, 1989

INVENTOR(S) : Thomas H. Jensen

It is certified that error appears in the above-identified patent and that said Letters Patent is hereby corrected as shown below:

Column 7, line 58, before the number "88" delete the term 'walls' and insert the term --wall--.

Column 8, line 4, after the term "use" delete the term 'as' and insert the term --are--.

Column 8, line 18, after the term "cal/°C./gm" delete the term 'witha' and insert the words --with a--.

Column 8, line 19, after the word "an" delete the word 'operation' and insert the word --operating--.

Column 8, line 53, after the word "control" delete the word 'to' and insert the word --of--.

Column 8, line 59, after the word "point" delete the term 'hiher' and insert the word --higher--.

Column 9, line 11, after the word "operation" delete the word 'of'.

Column 9, line 26, after the second occurrence of the word "the" insert the word --instant--.

Column 9, line 29, after the word "through" delete the term 'tthe' and insert the word --the--.

Column 9, line 54, after the word "fin" delete the word 'color' and insert the word --cooler--.

Column 10, line 4, after the word "the" delete the term 'peferred' and insert the word --preferred--.

UNITED STATES PATENT AND TRADEMARK OFFICE
CERTIFICATE OF CORRECTION

PATENT NO. : 4,824,457

DATED : April 25, 1989

INVENTOR(S) : Thomas H. Jensen

It is certified that error appears in the above-identified patent and that said Letters Patent is hereby corrected as shown below:

Column 10, line 27, after the word "transfer" delete the term 'fluis' and insert the word --fluid--.

Column 10, line 43, after the word "cooling" delete the term 'fings' and insert the word --fins--.

Column 11, line 14, after the word "flow" delete the term 'passagesincluding' and insert the words -passages including--.

Column 11, line 17, after the word "inflow" delete the term 'chanel' and insert the word --channel--.

Column 12, line 7, after the word "comprising" delete the dash (-) and insert a colon (:).

Signed and Sealed this

Twenty-third Day of January, 1990

Attest:

JEFFREY M. SAMUELS

Attesting Officer     Acting Commissioner of Patents and Trademarks